United States Patent [19]

Mayeux et al.

[11] Patent Number: 4,821,616

[45] Date of Patent: Apr. 18, 1989

[54] MACHINE FOR CUTTING FOOD PRODUCTS SUCH AS IN PARTICULAR VEGETABLES

[75] Inventors: Marcel Mayeux, Felletin; Christian Lallier; Joel Musseau, both of Aubusson, all of France

[73] Assignee: DITO - SAMA, Aubusson, France

[21] Appl. No.: 107,641

[22] Filed: Oct. 13, 1987

[30] Foreign Application Priority Data

Oct. 15, 1986 [FR] France .................. 86 14325

[51] Int. Cl.$^4$ .................. B26D 5/22; B26D 7/06
[52] U.S. Cl. .................. 83/355; 83/591; 83/596; 83/665; 83/666; 83/676; 83/158; 83/407; 241/82.4; 241/92
[58] Field of Search .................. 83/355, 356, 357, 591, 83/592, 596, 663, 665, 666, 676, 395, 394, 111, 112, 161, 42, 356.1, 158, 407; 241/82.4, 92; 366/195

[56] References Cited

U.S. PATENT DOCUMENTS

| | | | |
|---|---|---|---|
| 1,395,425 | 11/1921 | Kennedy | 83/394 |
| 1,766,825 | 6/1930 | Jones et al. | |
| 1,955,360 | 4/1934 | Ferry | 83/717 |
| 2,092,864 | 9/1937 | Wadsworth | 83/592 |
| 2,130,937 | 9/1938 | Urschel | |
| 2,442,210 | 5/1948 | Quinn et al. | 83/395 |
| 2,836,825 | 5/1958 | Schnell | |
| 3,137,334 | 6/1964 | Steele | 241/82.4 |
| 4,516,733 | 5/1985 | Funagura et al. | 241/92 |
| 4,685,364 | 8/1987 | Scheflow et al. | 83/355 |

FOREIGN PATENT DOCUMENTS

| | | |
|---|---|---|
| 99561 | 1/1986 | European Pat. Off. . |
| 41651 | 12/1887 | Fed. Rep. of Germany . |
| 3112743 | 10/1982 | Fed. Rep. of Germany . |
| 2109123 | 5/1972 | France . |
| 60859 | 3/1948 | Netherlands . |

Primary Examiner—Frank T. Yost
Assistant Examiner—Scott A. Smith
Attorney, Agent, or Firm—Wenderoth, Lind & Ponack

[57] ABSTRACT

This machine is of the type comprising a frame (1) supporting a hopper (2) for charging the products, a cutting plate, an ejection plate (6a, 6b) for ejecting the cut products disposed under the cutting plate (4), and a device (13) for driving in rotation the cutting plate and the ejection plate. According to the invention, the ejection plate is driven in rotation in a direction opposed to that of the cutting plate. Advantageously, the speed of rotation of the ejection plate is higher than that of the cutting plate.

14 Claims, 1 Drawing Sheet

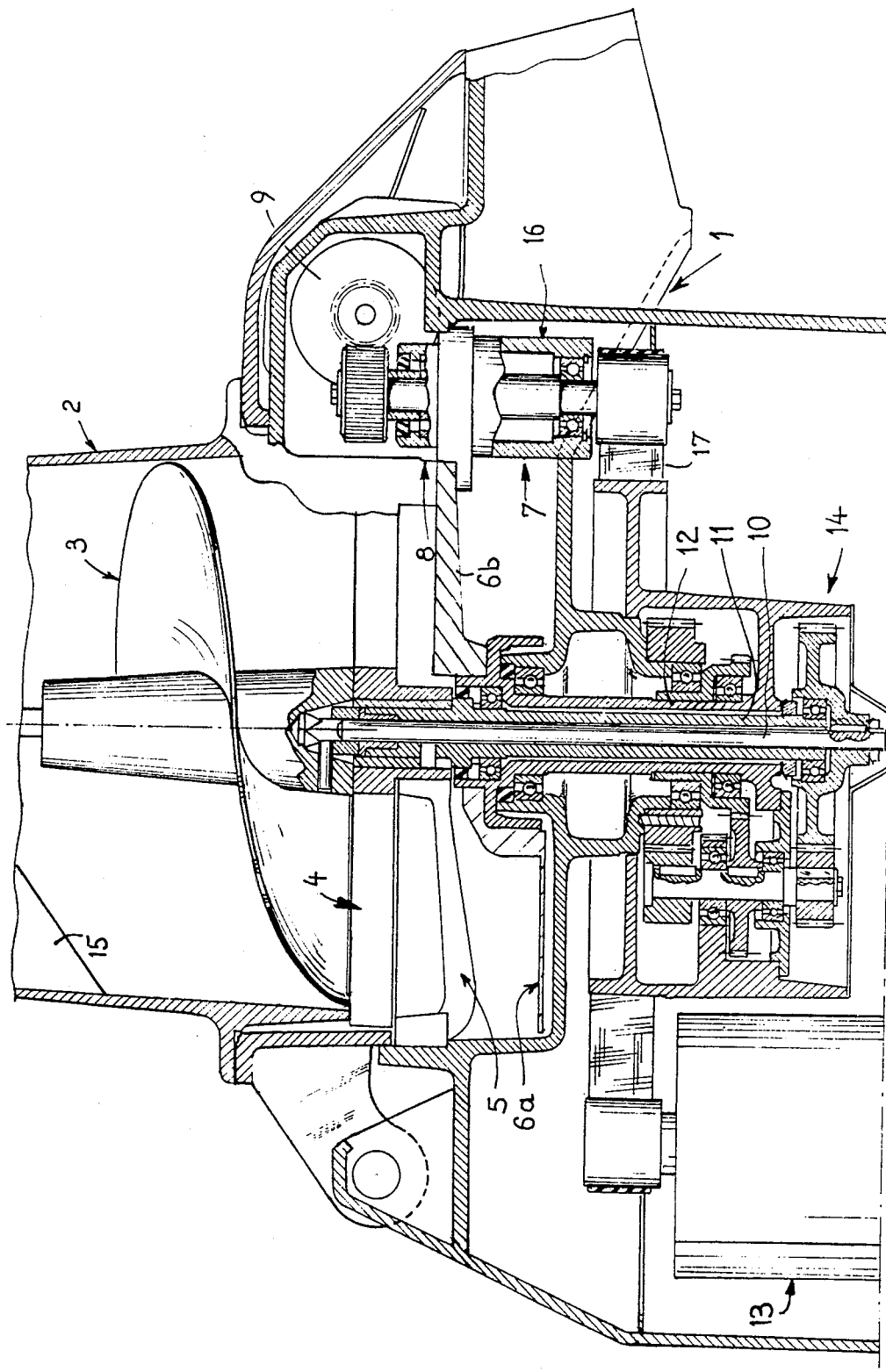

MACHINE FOR CUTTING FOOD PRODUCTS SUCH AS IN PARTICULAR VEGETABLES

The present invention relates to a machine for cutting food products, such as in particular vegetables.

More particularly, the invention concerns a machine of the type comprising a frame supporting a hopper for charging the products, a cutting plate, an ejection plate for ejecting the cut products located below the cutting plate, and means for driving the cutting plate and ejection plate in rotation.

A number of machines of this type are already known in the art, but they have drawbacks, in particular as concerns the risks of degradation of the products owing to a "packing" of the latter in certain parts of the machines, risks of the blocking of the rotating component parts, the regularity of the automatic feeding of the products to the cutting element, and finally the maintenance of the products during the cutting thereof.

An object of the invention is therefore to overcome these problems, by providing a machine whose structure is simple, reliable and of low price, while permitting an increase in the rate of treatment of the products for an improved quality.

The invention therefore provides a machine of the type described hereinbefore, wherein said ejection plate is driven in rotation in a direction opposed to the direction of rotation of the cutting plate.

Advantageously, the ejection plate is driven at a speed of rotation which is higher than that of the cutting plate.

A better understanding of the invention will be had from the following description which is given solely by way of example with reference to the accompanying drawing which represents a sectional view of machine according to the invention.

As can be seen in this FIGURE, a machine according to the invention for cutting food products, such as in particular vegetables, comprises a frame 1 on which is pivotally mounted a hopper 2 for charging the products in which may be disposed a rotary feed screw 3 for urging the products against a cutting plate 4. This cutting plate is of known type and will not be described in more detail.

This machine may be equipped with different cutting means for obtaining, for example, small sticks of vegetables or a macedoine of vegetables, and there have been shown in the left part of this FIGURE a machine equipped with a grate 5 permitting the obtainment of macedoine and an ejection plate 6a for ejecting the macedoine coming from the grate to a first ejection zone 7.

In the right part of this FIGURE, a machine has been shown which is equipped with an ejection plate 6b which is different from the first-mentioned plate and permits the ejection, for example of potatoes cut into slices by the cutting plate, in the direction of a second ejection zone 8, in which cutting means 9 are disposed for producing the small sticks. These means will be described in more detail hereinafter.

The machine according to the invention further comprises three coaxial shafts 10, 11 and 12, disposed one inside the other. One of the ends of the inner shaft 10 is connected to the feed screw 3, one of the ends of the intermediate shaft 11 is connected to the cutting plate 4, and one of the ends of the outer shaft 12 is connected to the ejection plate 6a or 6b. These connections are of known type and will not be described in detail.

The other ends of said shafts are connected to driving means 13 through respective gear means 14. These gear means comprise a number of planet gears cooperative with sun gears driven in rotation by the driving means 13. The gear means are so designed that the feed screw and the ejection plate are driven in rotation in a direction opposed to that of the cutting plate. Further, the ejection plate is driven at a speed of rotation which is higher than that of the cutting plate which has a speed of rotation higher than that of the feed screw so as to avoid any packing of the product.

As the gear means are of known type and do not present any particular difficulty in their use, they will not be described in more detail.

The driving means comprise a single motor, for example an electric motor, which permits, in the event of a problem, the stopping of the rotation of all the rotating component parts at the same time.

Further, a deformable abutment element 15, such as a flexible strip, is disposed in the hopper above the cutting plate for the purpose of orienting the products in the hopper and facilitating their entry into the feed screw.

As mentioned before, the machine according to the invention, comprises two ejection zones 7 and 8 for the cut products constituted for example by two spouts disposed one above the other and adapted to be associated with product ejection plates of different forms, as mentioned hereinbefore. The cutting means 9 are for example disposed in the upper spout in facing relation to the ejection plate 6b for ejecting the products cut into slices. These cutting means 9 comprise a plurality of discs fixed on a driving shaft connected to the driving means 13 through gear means 14 of known type. These discs are fixed on the shaft at a predetermined distance from each other and are disposed parallel to the axis of said spout, so as to determine the width of the cutting of the products. These means permit, for example, the cutting of slices of potatoes coming from the ejection plate in the direction of the length, so as to produce potatoe chips or "French fried potatoes". Indeed, the potatoes are urged against the cutting plate by the feed screw 3, and the slices of potatoe fall onto the ejection plate 6b. As the latter is driven in rotation, the slices of potatoe are urged, under the effect of centrifugal force, against the edge of the cutting chamber defined under the cutting plate and are ejected in the direction of the cutting means 9 disposed in the spout 8. These slices are then cut into small sticks by these means 9.

Note that the gear means 16 driving the cutting means 9 in rotation are so arranged as to drive the latter at such speed of rotation that their output is higher than the output of the cutting plate so as to avoid any packing of the product in this region.

Furthermore, these gear means 16 and the gear means 14 are driven by a belt 17 which extends around rolling surfaces of these gear means, and around the output shaft of the electric motor 13.

The machine according to the invention may also be equipped with a hopper which does not have a rotary feed screw, the ejection plate being again driven in rotation in the direction opposed to that of the cutting plate and at a higher speed. It will also be clear that although in the described embodiment the ejection zones are constituted by two spouts disposed one above the other, other embodiments are possible. Thus, for example, the zones may be arranged facing each other in the wall of the cutting chamber.

The machine according to the invention may be part of a more complete installation comprising for example a potatoe peeling device and conveyor means between the peeling device and the machine according to the invention.

What is claimed is:

1. A machine for cutting food products such as in particular vegetables, comprising a frame, a hopper for charging the products carried by the frame, a cutting plate, an ejection plate for ejecting the cut products and disposed below the cutting plate, and driving means for driving in rotation the cutting plate and the ejection plate, said ejection plate being driven in rotation in a direction opposed to the direction of rotation of the cutting plate.

2. A machine according to claim 1, wherein the driving means are arranged to drive the ejection plate in rotation at a speed higher than the speed of the cutting plate.

3. A machine according to claim 1, further comprising a rotary feed screw disposed in said hopper.

4. A machine according to claim 3, further comprising means for driving the feed screw in rotation in a direction opposed to the direction of rotation of the cutting plate.

5. A machine according to claim 4, said driving means for the feed screw being arranged to drive the feed screw at a speed of rotation which is lower than the speed of rotation of the cutting plate.

6. A machine according to claim 3, comprising three coaxial shafts disposed one inside the other, an end of the inner shaft being connected to the feed screw, an end of the intermediate shaft being connected to the cutting plate, and an end of the outer shaft being connected to the ejection plate, respective gear means connecting opposite ends of said shafts to the driving means.

7. A machine according to claim 1, wherein the driving means comprise a single motor.

8. A machine according to claim 1, comprising a deformable abutment element disposed in said hopper above the cutting plate.

9. A machine according to claim 1, comprising two zones for the ejection of the cut products adapted to be associated with product ejection plates of different forms.

10. A machine according to claim 9, wherein said ejection zones are constituted by spouts disposed one above the other.

11. A machine according to claim 9, further comprising cutting means disposed in one of said ejection zones.

12. A machine according to claim 10, further comprising cutting means disposed in an upper spout of said spouts.

13. A machine according to claim 11, wherein said cutting means comprise a drive shaft, gear means connecting said drive shaft to the driving means, and a plurality of discs fixed on said drive shaft, said discs being fixed on said drive shaft at a predetermined distance from one another and disposed to be parallel to a longitudinal axis of said one ejection zone so as to determine the width of the cutting of the products.

14. A machine according to claim 12, wherein said cutting means comprise a drive shaft, gear means connecting said drive shaft to the driving means, and a plurality of discs fixed on said drive shaft, said discs being fixed on said drive shaft at a predetermined distance from one another and disposed to be parallel to a longitudinal axis of said upper ejection zone so as to determine the width of the cutting of the products.

* * * * *